(12) United States Patent
Olson et al.

(10) Patent No.: US 7,744,280 B2
(45) Date of Patent: Jun. 29, 2010

(54) WASP REPELLENT DEVICE

(75) Inventors: Victoria Olson, Delta (CA); Kim Cassar-Torreggiani, West Vancouver (CA)

(73) Assignee: Contech Enterprises Inc., Victoria, British Columbia (CA)

( * ) Notice: Subject to any disclaimer, the term of this patent is extended or adjusted under 35 U.S.C. 154(b) by 852 days.

(21) Appl. No.: 11/149,149

(22) Filed: Jun. 10, 2005

(65) Prior Publication Data

US 2006/0228053 A1  Oct. 12, 2006

(51) Int. Cl.
*B65D 33/14* (2006.01)
*B65D 33/16* (2006.01)
*B65D 33/28* (2006.01)
*B65D 33/00* (2006.01)
*B65D 73/00* (2006.01)

(52) U.S. Cl. .............. 383/22; 383/24; 383/67; 383/72; 383/105; 206/457

(58) Field of Classification Search ............ 383/16, 383/22, 24, 67, 72, 75, 105; 206/457, 423; 43/1, 58, 107, 132.1, 133, 118, 121; 150/159, 150/160

See application file for complete search history.

(56) References Cited

U.S. PATENT DOCUMENTS

| | | | | |
|---|---|---|---|---|
| 1,811,574 A | * | 6/1931 | Barrett | 206/423 |
| 1,858,087 A | * | 5/1932 | Howard | 43/107 |
| 1,902,368 A | * | 3/1933 | Johns | 383/4 |
| 2,298,688 A | * | 10/1942 | Du Pont | 258/1 |
| 2,396,021 A | * | 3/1946 | Schloss | 150/160 |
| 2,616,467 A | * | 11/1952 | Cicero | 383/16 |
| D205,772 S | * | 9/1966 | Blair | D30/128 |
| 3,842,977 A | * | 10/1974 | Hollander | 206/407 |
| 3,939,888 A | * | 2/1976 | Scarnato | 220/666 |
| 4,076,121 A | * | 2/1978 | Clayton et al. | 206/390 |
| 4,333,267 A | * | 6/1982 | Witte | 47/84 |

(Continued)

FOREIGN PATENT DOCUMENTS

JP    2004-222576    8/2004

(Continued)

OTHER PUBLICATIONS bbum's weblog-o-mat Blog Archive Wasps. Wasps. <http://www.friday.com/bbum/2005/05/05/wasps/. Printed Oct. 27, 2009. Calgary Garden Coach. Garden design for patents and Zone 3(ish) gardeners. Time to put out the paper bag wasp nets. April 17, 2009.

(Continued)

*Primary Examiner*—Jes F Pascua
(74) *Attorney, Agent, or Firm*—Oyen Wiggs Green & Mutala LLP; Gerald O. S. Oyen

(57) ABSTRACT

According to the present invention, there is provided a wasp repellent device comprising a suspension member operatively connected to a closed end of a nest mimic The nest mimic has a skirt extending from the closed end of the nest mimic to a mouth of the nest mimic, with a drawstring for contracting the mouth of the nest mimic to give the nest mimic the approximate shape of slightly tapered inverted cone. The exterior of the nest mimic is provided with irregular and uneven striated pattern and, in use, the nest mimic imitates the appearance of a natural wasp nest.

5 Claims, 1 Drawing Sheet

U.S. PATENT DOCUMENTS

| | | | | |
|---|---|---|---|---|
| 4,413,725 A * | 11/1983 | Bruno et al. | | 206/770 |
| 4,873,100 A * | 10/1989 | Dirksing et al. | | 426/111 |
| 5,226,254 A | 7/1993 | MacMenigall | | |
| 5,293,975 A * | 3/1994 | Howorka | | 190/26 |
| 5,454,183 A | 10/1995 | Antonini et al. | | |
| 6,186,662 B1 * | 2/2001 | Jackson | | 383/16 |
| 6,224,259 B1 * | 5/2001 | Guerra | | 383/24 |
| 6,394,651 B2 * | 5/2002 | Jackson | | 383/75 |
| 6,647,663 B2 * | 11/2003 | Weder | | 47/72 |
| 7,073,942 B2 * | 7/2006 | Vazquez | | 383/2 |
| 7,083,331 B2 * | 8/2006 | Nykoluk | | 383/2 |
| 2007/0065053 A1 * | 3/2007 | Feinberg | | 383/105 |

FOREIGN PATENT DOCUMENTS

WO  02/43481 A1  6/2002

OTHER PUBLICATIONS

Calgary Garden Coach. Garden design for patents and Zone 3(ish) gardeners. Time to put out the paper bag wasp nets. Apr. 17, 2009. <http://calgarygardencoach.typepad.com/calgaiygardencoach/2009/04/time-to-put-out-the-paper-bag-wasp-nests.html> Printed Oct. 27, 2009.

Murphy, Lizzie. "The Medieval Idea to Take the Sting out of Summer", Yorkshire Post. Jan. 24, 2008.

Paper Bag Wasp Nests—Ontario Nature Discussion Form. Ask the Naturalist.<http://www.ontarionature.org/ubb/Formu7/HTML/000046.html> Printed Oct. 27, 2009.

* cited by examiner

WASP REPELLENT DEVICE

BACKGROUND OF THE INVENTION

1. Field of the Invention

The present invention relates to a wasp repellent device.

2. Description of the Related Art

Wasps are often attracted to kitchens, rooms and other indoor locations and to tents, picnics or other outdoor locations in search of food, thereby becoming a nuisance to the people in those locations. It is therefore desirable to be able to repel wasps from such locations. It is accordingly an object of this invention to provide a novel and improved wasp repellent device.

BRIEF SUMMARY OF THE INVENTION

According to the present invention, there is provided a wasp repellent device, comprising a nest mimic comprising a first end defining a mouth of the nest mimic and a second end opposite from the first end, the second end being closed; and a suspension member operatively connected to the second end at the exterior of the nest mimic.

In use, the nest mimic can be suspended by the suspension member, so that the nest mimic imitates the appearance of a natural aerial wasp nest having striations on the exterior, a downward facing entrance, and hanging from a solid object. A natural wasp nest is a nest produced by wasps. The nest mimic therefore serves to repel wasps from the vicinity of the nest mimic.

Also according to the present invention, there is provided a wasp repellent device, comprising a polypropylene nest mimic having a first end defining a nest mimic mouth, a second, closed end opposite from the first end and a pliable skirt between the first and second ends, the nest mimic having an uneven and irregular striated pattern applied to the exterior of the nest mimic, a suspension member operatively connected to the second end of the nest mimic at the exterior of the nest mimic, and a closing member adjustable for contracting the mouth of the nest mimic.

The closing member, in a preferred embodiment of the present invention, comprises a drawstring by means of which the mouth of the nest mimic can be constricted to give the nest mimic a slightly tapered inverted cone shape, as an imitation wasp nest.

BRIEF DESCRIPTION OF THE DRAWINGS

The invention will be more readily understood from the following description of an embodiment thereof given, by way of example only, with reference to the accompanying drawings, in which.

DESCRIPTION OF THE PREFERRED EMBODIMENT

Figure 1:
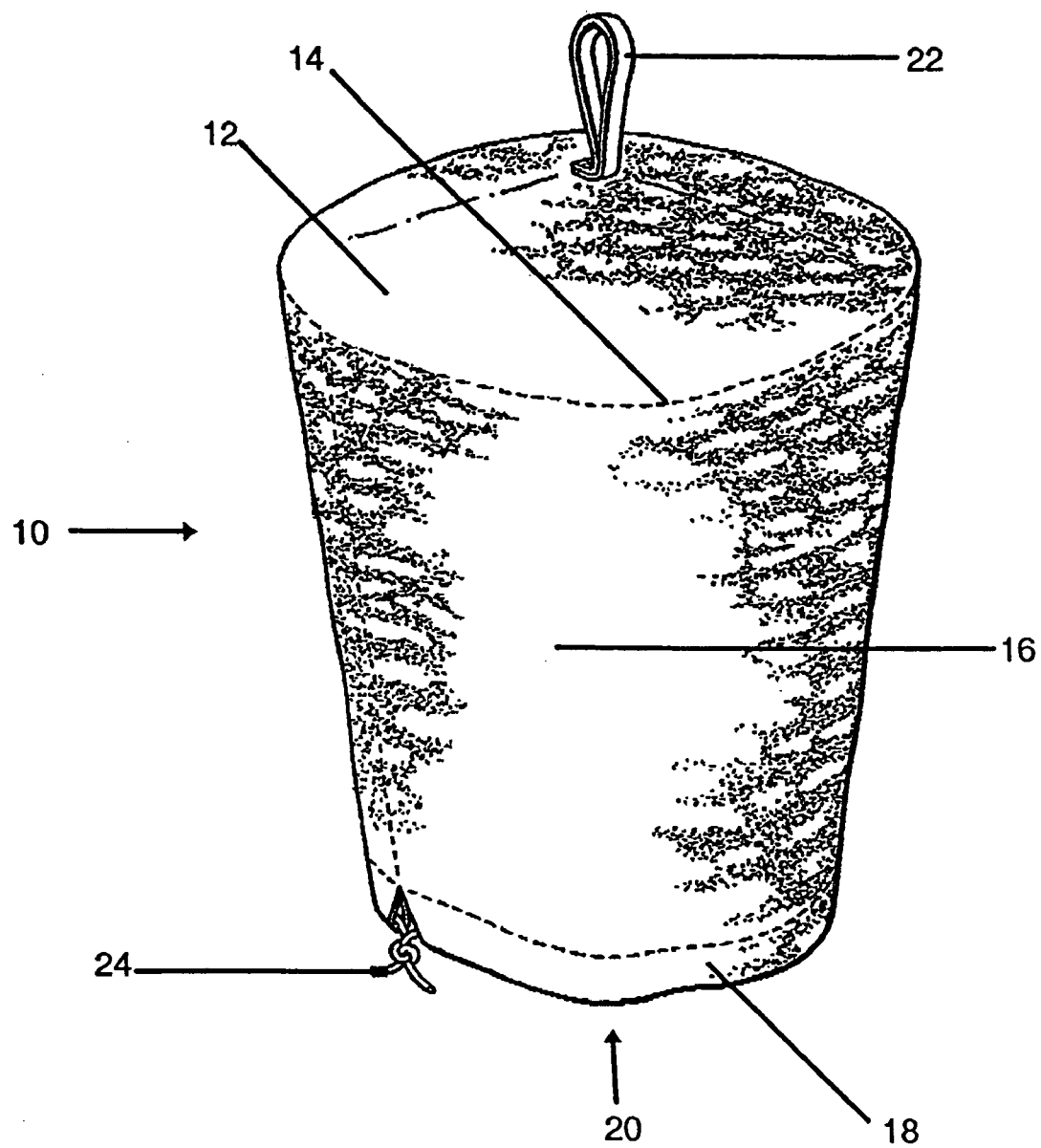
FIG. 1 is a perspective view showing a wasp repellent device according to an embodiment of the invention.

Referring to the drawing, there is shown an wasp repellent device in the form of a polypropylene nest mimic indicated generally by reference numeral 10, which has an uneven and irregular striated pattern printed on the exterior of the nest mimic 10.

The nest mimic 10 comprises, at one end of the nest mimic 10, a circular nest mimic portion 12 which is secured by a ring of stitching 14 to a pliable skirt 16. At the end of the nest mimic 10 opposite from the closed portion 12, the skirt 16 is provided with a seam 18 around a nest mimic mouth indicated generally by reference numeral 20.

In this embodiment of the invention, the exterior of the nest mimic 10 is printed with a striated pattern with contrasting shades of grey. However, other means of striating the nest mimic 10 may substituted. By way of example only, differences in texture may be used to striate the nest mimic 10.

A suspension member in the form of a polypropylene loop 22 is fixed by stitching to the closed portion 12 and when the nest mimic is in use serves to suspend the nest mimic 10 from a solid object, for example, an overhead hook or the like (not shown). In this embodiment of the invention, the suspension member is formed as the loop 22, which is stitched to the closed portion 12. Loop 22 extends outwardly from closed portion 12. However, other suitable means for suspending the nest mimic 10 may be substituted. By way of example only, a hook may be secured to the nest mimic.

A closing member in the form of a drawstring 24 is operatively connected to the nest mimic 10 by being threaded through the seam 18. The drawstring 24 can be pulled to contract the mouth of the nest mimic in a manner such that the seam 18 of the nest mimic 10 is drawn towards a central point, thereby forming the inverted nest mimic into the approximate shape of a natural wasp nest. In this embodiment of the invention, the drawstring 24 is provided as the closing member and the drawstring 24 may comprise a toggle (not shown). However, other suitable means for closing the mouth of the nest mimic may be substituted.

The nest mimic 10 functions as follows:

The nest mimic 10 is suspended by means of the polypropylene loop 22 in a location from which it is desired to repel wasps and the mouth of the nest mimic 10 is contracted by means of the drawstring 24, so that the nest mimic 10 assumes the slightly tapered inverted cone shape with a downward facing mouth in imitation of a wasp nest, as mentioned above. The skirt 16 of the nest mimic 10 may be adjusted manually to configure the nest mimic 10 into the desired shaped, for example by expanding skirt 16 to its full extent. Wasps then perceive the nest mimic 10 to be an enemy nest and avoid the area.

As will be apparent to those skilled in the art, various modifications may be made in the above-described embodiment of the present invention within the scope of the appended claims.

We claim:

1. A wasp repellent device, comprising:
    a nest mimic,
    comprising a first end defining a mouth, a second end, the second end being closed and opposite from the first end, and a pliable skirt joining the first and second ends;
    the nest mimic further comprising an uneven and irregular striated pattern applied to the exterior thereof so as to resemble striations of a natural wasp nest; and
    a suspension member fixed to the second end of the nest mimic at the exterior of the nest mimic, the suspension member extending outwardly from the second end;
    whereby the nest mimic assumes a position and structure of a natural wasp nest with the suspension member suspending the nest mimic from a solid object with the mouth defined by the first end facing downwardly and the closed second end facing upwardly, and the pliable skirt expanded to its full extent so that the nest mimic assumes a slightly tapered inverted cone shape of a natural wasp nest.

2. A wasp repellent device as claimed in claim 1, wherein the suspension member comprises a polypropylene loop.

3. A wasp repellent device as claimed in claim 1, wherein the nest mimic is made of polypropylene.

4. A wasp repellent device as claimed in claim 1, further comprising a closing member adjustable for contracting the mouth of the nest mimic in a manner such that the first end of the bag is drawn towards a central point.

5. A wasp repellent device as claimed in claim 4, wherein the closing member comprises a drawstring.

\* \* \* \* \*